US008632622B2

(12) United States Patent
Boehm et al.

(10) Patent No.: US 8,632,622 B2
(45) Date of Patent: Jan. 21, 2014

(54) PROCESS AND DEVICE FOR PRODUCING PIG IRON OR LIQUID STEEL PRECURSORS

(75) Inventors: Christian Boehm, Thalheim (AT);
Jan-Friedemann Plaul, Linz (AT);
Johannes Leopold Schenk, Linz (AT)

(73) Assignee: Siemens Vai Metals Technologies GmbH (AT)

( * ) Notice: Subject to any disclaimer, the term of this patent is extended or adjusted under 35 U.S.C. 154(b) by 254 days.

(21) Appl. No.: 12/996,415

(22) PCT Filed: Apr. 27, 2009

(86) PCT No.: PCT/EP2009/055047
§ 371 (c)(1),
(2), (4) Date: Jan. 10, 2011

(87) PCT Pub. No.: WO2009/146982
PCT Pub. Date: Dec. 10, 2009

(65) Prior Publication Data
US 2011/0138965 A1    Jun. 16, 2011

(30) Foreign Application Priority Data
Jun. 6, 2008    (AT) .................................. A 920/2008

(51) Int. Cl.
*C21B 13/02*    (2006.01)
*C21B 13/14*    (2006.01)

(52) U.S. Cl.
USPC ................... 75/443; 75/488; 75/503; 75/505

(58) Field of Classification Search
USPC .................................. 75/503, 505, 443, 488
See application file for complete search history.

(56) References Cited

U.S. PATENT DOCUMENTS 3,759,697 A * 9/1973 Metrailer et al. ................ 75/451
3,917,480 A * 11/1975 Malgarini et al. .............. 75/450

(Continued)

FOREIGN PATENT DOCUMENTS

| CN | 1426483 | 6/2003 |
| DE | 4421673 | 1/1995 |

(Continued)

OTHER PUBLICATIONS

Chinese Office Action dated Aug. 23, 2012 issued in corresponding Chinese Patent Application No. 200980121147.3 filed Apr. 27, 2009.

(Continued)

*Primary Examiner* — George Wyszomierski
*Assistant Examiner* — Tima M McGuthry Banks
(74) *Attorney, Agent, or Firm* — Ostrolenk Faber LLP

(57) ABSTRACT

A process for producing pig iron or liquid primary steel products in a smelting unit (1), in particular a melter gasifier. Iron-ore-containing charge materials, and possibly additions, are at least partially reduced in at least one reduction unit (R1, R2, R3, R4) by means of a reducing gas. A first fraction of the at least partially reduced charge materials is melted down in the smelting unit (1), while carbon carriers and oxygen-containing gas are supplied, with the simultaneous formation of the reducing gas. The reducing gas is fed to the reduction unit (R1, R2, R3, R4) and, after the reducing gas has passed through the reduction unit, it is drawn off as top gas. A second fraction of the at least partially reduced charge materials is fed to a smelting reduction unit for reducing and smelting.

22 Claims, 4 Drawing Sheets

(56) References Cited

U.S. PATENT DOCUMENTS

Figure 1:
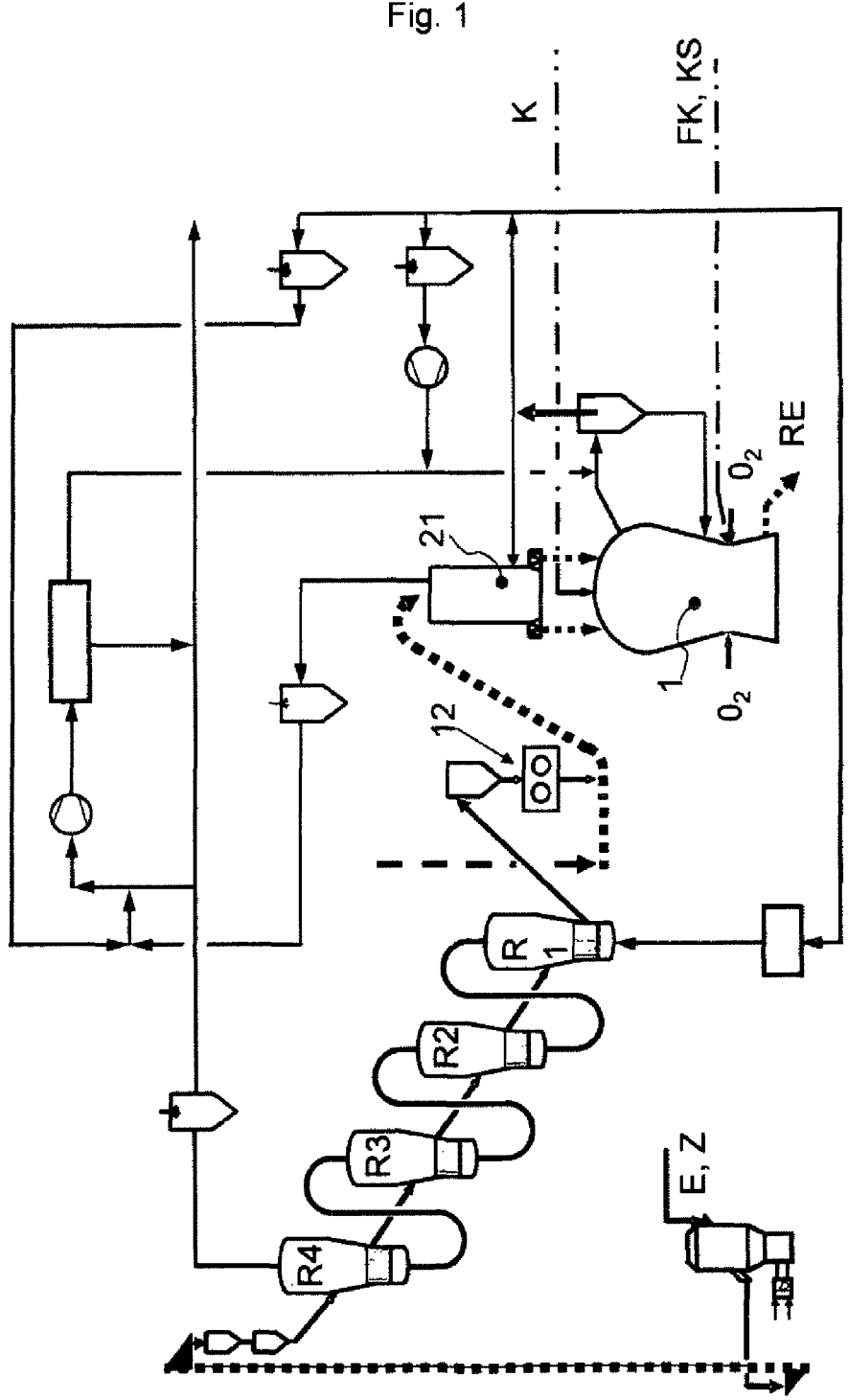

| | | | |
|---|---|---|---|
| 4,804,408 A * | 2/1989 | Puhringer et al. | 75/492 |
| 5,518,523 A * | 5/1996 | Brotzmann | 75/501 |
| 6,143,053 A * | 11/2000 | Reidetschlager et al. | 75/444 |
| 6,149,708 A * | 11/2000 | Kepplinger et al. | 75/446 |
| 6,251,162 B1 * | 6/2001 | Eichberger et al. | 75/492 |
| 6,519,942 B2 | 2/2003 | Wintrell | 60/772 |
| 6,645,269 B2 * | 11/2003 | Zirngast | 75/446 |
| 2003/0041690 A1 | 3/2003 | Zirngast | C22B 5/14 |
| 2006/0162499 A1 | 7/2006 | Lee et al. | |

FOREIGN PATENT DOCUMENTS

| | | |
|---|---|---|
| EP | 0871782 A | 10/1998 |
| EP | 0871782 | 12/2001 |
| UA | 73 768 C2 | 9/2005 |
| UA | 79 476 C2 | 6/2007 |
| UA | 27 764 U | 11/2007 |
| WO | WO 2006/011774 A1 | 2/2006 |
| WO | WO 2006/043770 A1 | 4/2006 |
| WO | WO 2006/075977 A | 7/2006 |

OTHER PUBLICATIONS

International Search Report dated Aug. 6, 2009, issued in corresponding international application No. PCT/EP2009/055047.

Notice of Allowance dated Apr. 18, 2013 in corresponding Ukraine Patent Application No. a201014634.

Official Action dated Feb. 28, 2013 in corresponding Ukraine Patent Application No. a201014634 and English translation thereof.

* cited by examiner

PROCESS AND DEVICE FOR PRODUCING PIG IRON OR LIQUID STEEL PRECURSORS

CROSS-REFERENCE TO RELATED APPLICATIONS

The present application is a 35 U.S.C. §§371 national phase conversion of PCT/EP2009/055047, filed Apr. 27, 2009, which claims priority of Austrian Application No. A920/2008 filed Jun. 6, 2008, the contents of which are incorporated by reference herein. The PCT International Application was published in the English language.

BACKGROUND OF THE INVENTION

The invention relates to a process for producing pig iron or liquid primary steel products in a smelting unit, in particular a fusion gasifier, in which iron-ore-containing charge materials, in particular fine ore, and possibly additions, are at least partially reduced in at least one reduction unit by means of a reducing gas.

The invention also relates to an installation for producing pig iron or liquid primary steel products by the process according to the invention, with a smelting unit, in particular a fusion gasifier, and at least one reduction unit for reducing iron-ore-containing charge materials, and possibly additions, by means of a reducing gas formed in the smelting unit while carbon carriers, in particular coal, and oxygen-containing gas are supplied.

It is known from the prior art that pig irons or liquid primary steel products can be produced in a smelting reduction process. In particular, it is known to use reducing gas that is produced in a smelting unit while coal is supplied for reducing iron-containing ores.

To increase the efficiency of such installations, DE 44 21 673 discloses that the reducing gas formed in a fusion gasifier can be used in a treated form in a blast furnace, so that the export gas can be used and the efficiency of the process can be increased. It is disadvantageous in this case that the export gas has a high calorific value for the blast furnace, so that the efficiency of the process that is achieved is restricted. One object of the present invention is to increase further the efficiency of the process, with in particular the amount of coal that is necessary per tonne of pig iron or liquid primary steel products being lower, so that a smaller amount of carbon dioxide ($CO_2$) occurs.

This object is achieved by the process according to the invention as claimed in claim 1 and by the apparatus thereof.

SUMMARY OF THE INVENTION

By the process according to the invention, a first fraction of the at least partially reduced charge materials is melted down in the smelting unit while carbon carriers, in particular coal, and oxygen-containing gas are supplied, with the simultaneous formation of the reducing gas. The reducing gas is fed to the reduction unit and, after it has passed through the latter, is drawn off as top gas. A second fraction of the at least partially reduced charge materials is fed to a smelting reduction unit for reducing and smelting. The at least partially reduced charge materials are also referred to as Low Reduced Iron (LRI), these intermediate products serve as charge materials for subsequent stages in the process of iron production or the production of liquid primary steel products. It is possible by the process for an at least partially reduced charge material, the Low Reduced Iron (LRI), also to be processed in a smelting reduction unit provided in addition to the smelting unit. A considerable proportion of reducing agent is saved in the smelting reduction unit on account of the reduction that has already partially taken place. Consequently, the overall balance of the production of pig iron or liquid primary steel products is reduced with respect to the process materials that are necessary, in particular the coal. In addition, the productivity of the smelting reduction unit can at the same time be increased. Of the overall amount of at least partially reduced charge materials that is produced, only a first fraction is processed in a smelting unit, such as for example a fusion gasifier.

According to an advantageous refinement of the process according to the invention, the amount of the second fraction of the at least partially reduced charge materials is established in accordance with the desired amount of top gas and/or the amount of export gas and/or the quality of the export gas. The reducing gas discharged from the at least one reduction unit is referred to as top gas. After appropriate treatment, this top gas may be used as an energy source, it being possible for the treated gas to be used as an export gas in other processes, such as for example power generation.

The quality of the export gas is defined by means of gas analysis, that is to say the composition of the export gas and the resultant calorific value. The composition of the export gas depends, inter alia, on the amount of LRI that is produced for example in a smelting reduction unit. The greater the amount of LRI that is produced, the lower the calorific value and the amount of export gas. The reason for this is that, when a large amount of the top gas is reused in the reduction unit, the proportions of carbon monoxide (CO) and hydrogen ($H_2$) always become lower and the proportion of $CO_2$ in the export gas increases. The amount of export gas is reduced, since the proportion of $H_2$ falls. The higher LRI production has the effect that more $H_2$ is consumed, resulting in turn in more water ($H_2O$) being produced. This is separated in the top gas scrubber.

The specific use of the top gas discharged as export gas, and possibly treated, presupposes that a certain amount is supplied, so that the amount of top gas varies in relation to the amount of reduced LRI and so the reduction process can be adapted to the requirements of the further process of processing the top gas.

According to a further advantageous refinement of the process according to the invention, the amount of the second fraction of the at least partially reduced charge materials (LRI) is 0-1.2 times the amount of the pig iron obtained in the smelting unit. If need be, the second fraction can therefore be taken back to zero or else increased to the extent that it is higher than the amount of pig iron produced in the smelting unit. On account of the fact that the reducing gas is produced in the smelting unit, it has proven to be technically advisable for the amount of LRI to be varied in the specified range, and consequently an advantageous match to be found between the reduction unit and the smelting unit.

According to the invention, the amount of the second fraction of the at least partially reduced charge materials is 10-60%, in particular 20-40%, with reference to the iron fraction of all the Fe carriers that are charged into the smelting reduction unit. The LRI charged into the smelting reduction unit substitutes for iron-containing charge materials. On account of the necessity that reducing materials or further process auxiliaries also have to be used in a smelting reduction unit, it has been found to be advantageous if up to a maximum of 60% LRI is used. In this case, the technically conventional percentages relate to the iron fraction of all Fe carriers in the smelting reduction unit.

According to one particular refinement of the process according to the invention, the degree of reduction in the case of the second fraction of the at least partially reduced charge materials and/or in the case of the charge materials used in the smelting unit is set to 40-95%, in particular 65-75%. These degrees of reduction ensure rapid processing of the pre-reduced intermediate products in the downstream smelting unit or in the smelting reduction unit, so that the amount of necessary reducing materials in these units can be kept low. In addition, the reduction process in the reduction unit can be adapted by way of the degree of reduction or the amount of reducing gas or the composition of the reducing gas, so as to obtain a more flexible process which can be stably conducted with a wide range of parameters.

A special refinement of the process according to the invention provides that the at least partial reduction of the iron-ore-containing charge materials takes place in a row of 2 to 6, in particular 3 or 4, reduction units connected in series, the reducing gas being conducted in a countercurrent direction in relation to the iron-ore-containing charge materials to be reduced. The plurality of reduction units arranged one behind the other makes it possible for the temperature in the individual reduction units to be controlled more accurately, it being possible for the temperature control to be adapted to the respective charge material or the degree of reduction. Moreover, individual units can be operated as preheating units.

A possible refinement of the process according to the invention provides that the reduction of the iron-ore-containing charge materials, and possibly the additions, takes place in at least two mutually parallel rows of reduction units connected in series. The use of two or more rows of reduction units connected in series allows the amount of reduced charge materials to be correspondingly adapted or increased, the reducing gas that is produced in the smelting unit always being used. This has the consequence that at least partially reduced iron-ore-containing charge materials can be produced in such an amount that not only the smelting unit but also a smelting reduction unit can be supplied with them.

According to a preferred refinement of the process according to the invention, the at least partially reduced charge material is passed on for compacting, in particular hot compacting, such as for example hot briquetting. This allows the handling of the reduced charge materials to be made easier, in particular to avoid re-oxidation and dust development in further processing. The compacting has the effect of reducing the porosity and specific surface area of the reduced charge materials, and of largely eliminating the fines. As a result, oxidation is inhibited during further processing (transport and storage) and at the same time the flow behavior of the compacted materials is also improved. Conventional compacting processes take place with hot material, so that said material is not cooled after treatment in the reduction unit but can be processed directly. This has the consequence that the energy balance is improved and direct processing can take place in the compacting or subsequently in the smelting unit or in the smelting reduction unit. In particular, hot briquetting has been found to be advantageous.

According to a special refinement of the process according to the invention, the second fraction of the at least partially reduced charge materials is charged into the smelting reduction unit as an Fe carrier, in particular in place of sinter. Sinter has the disadvantage that it first has to be produced on the basis of sinterable iron ores in a complex process, causing a very considerable occurrence of problematic emissions in the form of gas and dust. Use of the aforementioned second fraction (LRI) allows a considerable proportion of the sinter to be substituted. Furthermore, on account of the reduction that has already taken place, it is also possible for the amount of carbon carriers that is necessary in the smelting reduction unit, in particular coke, to be reduced considerably, so that a significant cost advantage can be achieved.

Particularly advantageously, according to the invention the at least partially reduced charge materials may be introduced into the smelting unit and/or into the smelting reduction unit in a hot state, possibly with the admixture of cold partially reduced charge materials. Hot charging allows energy to be saved and the admixing of cold partially reduced charge materials allows the temperature of such materials to be adapted during the charging or in the further processing process.

A special refinement of the process according to the invention provides that the at least partially reduced charge materials are hot-compacted and, to avoid oxidation processes, are cooled, in particular by quenching in a water bath. For the case where it is not intended or possible for the at least partially reduced charge materials to be further produced directly, it is necessary to cool the charge materials, in order to avoid oxidation processes, so that said materials can also be stored without a protective gas atmosphere. Quenching in a water bath has been found to be a low-cost variant.

According to a particularly advantageous refinement of the process according to the invention, the reduction of the charge materials takes place in a fluidized bed, in particular a circulating or bubbling fluidized bed, in the reduction unit.

A solid bed through which a stream of fluid flows forms a fluidized bed once a certain flow rate is reached. At high flow rates, bubbles form in the fluidized bed.

Depending on the particle shape of the charge materials, the particle size or the density, a fluidized bed forms with a specific proportion by volume of solids. The flow rate is in this case lower than the sinking rate of the particles. A compact suspension layer forms with a surface that is churned up by bursting bubbles. Intensive mixing in a vertical direction is advantageous.

At very high flow rates, there is an increased discharge of finer particles from the fluidized bed, these particles being returned to the solids separation by way of a cyclone. The advantages of the circulating fluidized bed over the bubbling fluidized bed lie in a distinctly higher flow rate, which for example makes efficient reduction processes possible, through intimate mixing of reducing gas and charge material to be reduced.

The type of fluidized bed is chosen according to the charge materials and in particular according to the grain size or the grain size distribution. Bubbling fluidized beds are used in the case of a grain size of the charge materials to be reduced of ≤8 mm and an average grain size $d_{50}$ of approximately 0.5 to 2.0 mm. Circulating fluidized beds are used in the case of grain sizes of 0.1 to 1 mm and an average grain size $d_{50}$ of 0.5 mm.

According to an alternative refinement of the process according to the invention, the reduction of the charge materials takes place in a reducing shaft furnace, a rotary tubular furnace or a rotary hearth furnace, the charge materials being used in the form of pellets and/or lump ore and/or as sinter. This allows different charge materials to be used, using various reduction units.

A further alternative refinement of the process according to the invention by the reduction of the charge materials taking place on levels lying one above the other in a multi-level reduction furnace, the charge materials undergoing restricted guidance by means of a clearer. The restricted guidance allows even charge materials that have a tendency to agglomerate to be processed.

According to a special, advantageous refinement of the process according to the invention, excess reducing gas is dedusted, scrubbed, possibly mixed with top gas and compressed as recycled gas, fed to a $CO_2$ separation unit, for separation of at least some $CO_2$ from the recycled gas, and subsequently passed as a product gas into the dedusting device or directly into the reduction unit. After scrubbing, which serves for the separation of solids, after mixing with top gas and after separation of $CO_2$, excess reducing gas that is not fed directly to a reduction unit can be re-used as a high-quality reducing gas. In this case, the amount of reducing gas can be increased and the top gas can be passed on for a further use in addition to use as an export gas.

A special refinement of the process according to the invention provides that the pressure in the smelting unit is set by means of a scrubber for scrubbing the excess reducing gas. Typically, annular gap scrubbers are used for the scrubbing of the excess reducing gas, so that the counter pressure, and consequently the pressure in the smelting unit, can be easily set by way of a change in the flow resistance in the scrubber, for example by changing the annular gap.

Particularly advantageously, according to the invention the product gas is heated before it is returned into the dedusting device or directly into the reduction unit. Heating allows the process temperature in the reduction unit to be specifically set and for unwanted temperature changes to be avoided. The energy balance of the process is thereby improved.

According to an advantageous refinement of the process according to the invention, the top gas is cooled and scrubbed before mixing with the excess, dedusted reducing gas, the heat that is removed from the top gas being used for heating the product gas before it is returned into the dedusting device or into the reduction unit. The heat of the top gas is used to set the temperature of the product gas; at the same time, the hot top gas is cooled to the extent that it can be passed on for further uses or treatment steps.

According to a special variant of the process according to the invention, the separated $CO_2$ is discharged together with top gas as export gas. Usually, the top gas separated in the $CO_2$ separating unit is discharged from the $CO_2$ separating unit as so-called tail gas, the process dictating that mostly small amounts of other gases are discharged with the $CO_2$. By mixing with some of the top gas, it is possible to produce a process gas which can be passed on for further uses as export gas.

A possible refinement of the process according to the invention is achieved by the amount of recycled gas and the amount of carbon carriers, in particular coal, in the smelting unit being established in accordance with the amount of the at least partially reduced charge materials. The amount of coal in the smelting unit establishes on the one hand the temperature in the smelting unit and on the other hand also the amount of reducing gas that is available for the reduction. Consequently, the process can be operated by adapting the process materials, such as for example the coal, within a wide range of parameters or range of amounts.

According to the invention, the reducing gas is partially combusted in the reduction unit while oxygen is supplied to set the temperature of the reduction unit. As a result, it is possible to specifically set or vary the temperature of the reduction unit, and thereby the process temperature in the reduction unit. If a plurality of reduction units are used, a partial combustion may take place in each reduction unit, so that each reduction stage can be influenced with respect to its temperature and the reducing capability of the reducing gas.

A suitable refinement of the process according to the invention provides that the charge materials are mixed with additives, in particular limestone, burnt lime, hydrated lime, dolomite, burnt or hydrated dolomite or quartz, and preferably dried before being charged into the at least one reduction unit, the charge materials and the additives having approximately the same grain size. The advantageous mixing with the auxiliaries makes largely homogeneous reduction possible, the grain sizes having to be adapted in such a way that short reduction times and uniform reduction can be ensured. In the case of high, critical moisture contents of the charge materials (typical values for a moisture content of over 8%), energy consumption in the reduction unit is reduced by prior drying. It has also been found that drying is also advantageous in cases of lower moisture contents (as from a moisture content of approximately 4%), since this ensures that the charge materials can flow in the transporting systems and feed containers. In cases of lower moisture contents, the charge materials can also be used without prior drying.

With the apparatus according to the invention, the capacity of the reduction units can be adapted in such a way that a greater amount of reduced charge material is obtained with a smelting unit that also serves as a reducing gas generator. The hot compacting upstream of the smelting unit allows at least partially reduced charge materials in lump form to be produced, forming a high-quality charge material for pig iron production. On the basis of at least two parallel rows of reduction units connected in series, the installation can be operated very flexibly. It is usual here to have rows with 3 or 4 reduction units. For example, for servicing work it is possible to operate just one row of the reduction units, while the other row is being serviced. Furthermore, it is conceivable to adapt the amount of at least partially reduced charge material within a wide range, the amount of carbon carriers not having to be increased, or only slightly.

A possible variant of the installation according to the invention provides that one of the devices for hot compacting is in connection with a charging container or a reduction shaft, for receiving or further reducing the compacted, at least partially reduced charge materials, this container or shaft being arranged above the smelting unit, so that charging into the smelting unit is possible. The use of a reduction shaft for the charging into the smelting unit allows oxidation of the compacted and at least partially reduced charge material to be avoided, even if there are delays in the charging into the smelting unit. A very simple solution is obtained by using a charging container, it also being possible here to provide a shielding gas to avoid oxidation processes. The charging of the charging container or from the reduction shaft may take place with the aid of discharging elements such as conveying screws, clearers or rotary cell transfer units by gravitational force or else by transporting devices.

According to a special variant of the installation according to the invention, at least one of the devices for hot compacting is connected to a device for quenching the compacted, at least partially reduced charge materials. The direct quenching and associated cooling allows unwanted oxidation processes to be avoided; this distinctly increases the time for which the at least partially reduced charge materials can be stored.

According to a particularly advantageous embodiment of the installation according to the invention, one of the devices for hot compacting is coupled to a smelting reduction unit, in particular a blast furnace, an electric low-shaft furnace or a liquid bath furnace in such a way that the compacted, at least partially reduced charge materials can be introduced into the smelting reduction unit. Consequently, the smelting unit is coupled to the reduction unit or units and to a further smelting reduction unit, so that flexible charging into the smelting unit or the smelting reduction unit is possible. Altogether, the coupling of the units allows pig iron production with a distinctly smaller amount of $CO_2$ to be achieved. The type of furnace can be chosen according to requirements, so that with most existing installations a combination is possible, for example by adding a smelting unit and the reduction unit or units.

A possible embodiment of the installation according to the invention is achieved by the smelting unit being connected by way of a line to a dedusting device, in particular a dry dedusting device, preferably a cyclone or a reduction cyclone, for the separation of dusts from the reducing gas, it being possible for the dedusted reducing gas to be fed to the rows of reduction units by way of a reducing gas feed line. The dedusting allows the quality of the reducing gas to be improved by eliminating fines and dusts. The use of a dry dedusting device makes it possible to keep down the cooling of the reducing gas, so that said gas can be fed to the reduction unit or units largely without any further heating.

A further possible embodiment of the installation according to the invention is achieved by the reducing gas feed line being connected to a scrubber for excess reducing gas in such a way that reducing gas that is not required in the reduction units can be discharged and scrubbed. In this way it is possible to lead off some of the reducing gas and treat it separately, in particular by a scrubber, so that solids are largely eliminated. The excess, cleaned reducing gas can then be passed on for further uses.

According to a particularly advantageous embodiment of the installation according to the invention, the scrubber is connected by means of a recycled gas line to a $CO_2$ separating unit, in particular on the basis of an adsorption process with a pressure change or an absorption process, for the separation of $CO_2$ from the scrubbed reducing gas, it being possible for the product gas thereby formed to be fed by way of a product gas line to the dedusting device or the reduction units.

The $CO_2$ separating unit may be used on the basis of various technologies or the processes mentioned; apart from the physical absorption processes, such as for example the rectisol process on the basis of cold methanol as a solvent, chemical absorption processes can also be used, such as the MEA process on the basis of monoethanolamines and the DEA process on the basis of diethanolamines or else the Benfield process on the basis of potassium carbonate with an inhibitor. As an alternative to these known processes, it is also possible to use adsorption processes, using in particular pressure changing processes that use a selective adsorption behavior of a molecular sieve in dependence on pressure. It is particularly advantageous in this respect if the lower pressure stage is operated at subatmospheric pressure, as is usual with vacuum pressure changing processes.

According to an advantageous embodiment of the installation according to the invention, at least one of the rows of reduction units is connected by way of a top gas discharge line to the recycled gas line, so that the top gas discharged from the reduction units can be mixed with the scrubbed excess reducing gas and fed by way of a compressor to the $CO_2$ separating unit. By the inclusion of the top gas, it is possible to free the excess reducing gas and the top gas of $CO_2$ and thereby generate a reducing gas that has a high reduction capability. The product gas obtained in this way can be used again as a high-quality reducing gas in the reduction unit or units, so that a greater amount of charge materials can be reduced without more carbon carriers having to be used in the smelting unit.

A particularly advantageous embodiment of the installation according to the invention is achieved by the top gas line and the product gas line each having at least one heat exchanger for cooling the top gas and for heating the product gas, it being possible for the heat removed from the top gas to be fed to the product gas. In this way it is possible to extract heat from the top gas and thereby correspondingly cool the very hot top gas and to heat the product gas before it is introduced into the reduction units.

According to an advantageous embodiment of the installation according to the invention, at least one oxide dryer is provided for mixing and drying the iron-ore-containing charge materials, and possibly the additions, said dryer being connected by way of transporting devices and feed containers to the rows of reduction units. The drying and mixing achieves a homogeneous mixture, which makes uniform reduction in the reduction units possible.

The invention is described hereafter by way of example on the basis of a non-restrictive exemplary embodiment and the figures.

BREIF DESCRIPTION OF THE DRAWINGS

Figure 2:
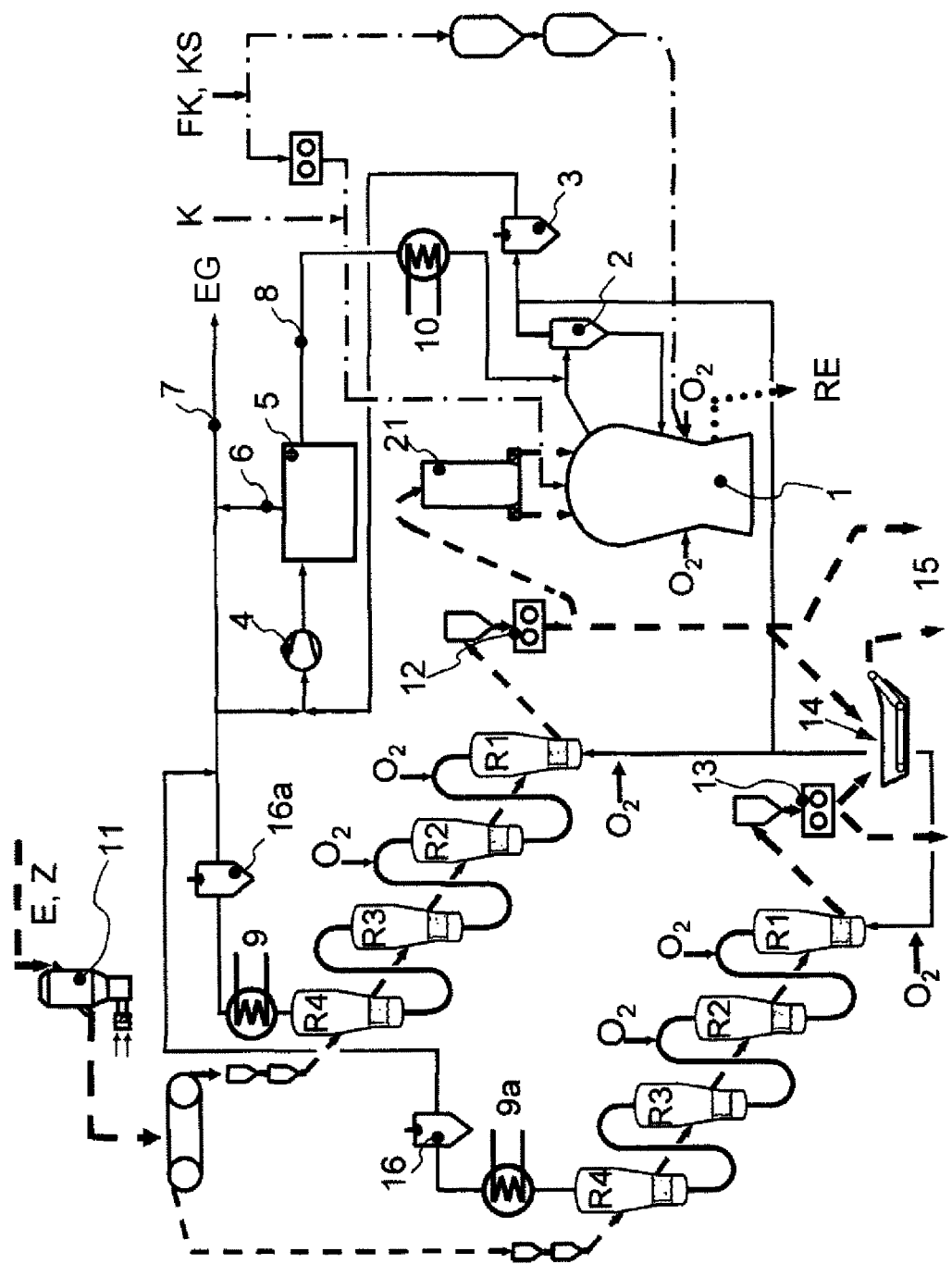
Figure 3:
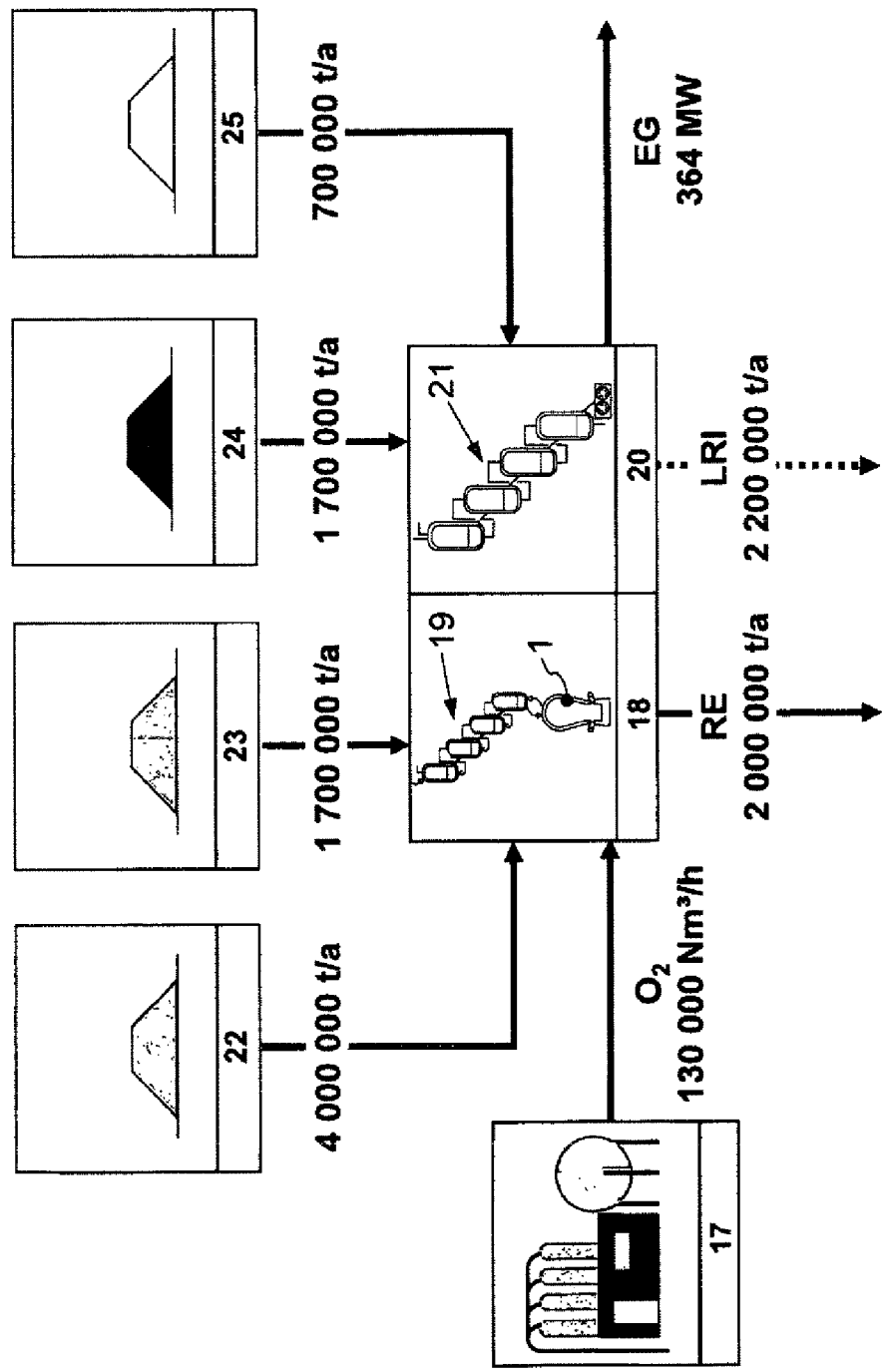
Figure 4:
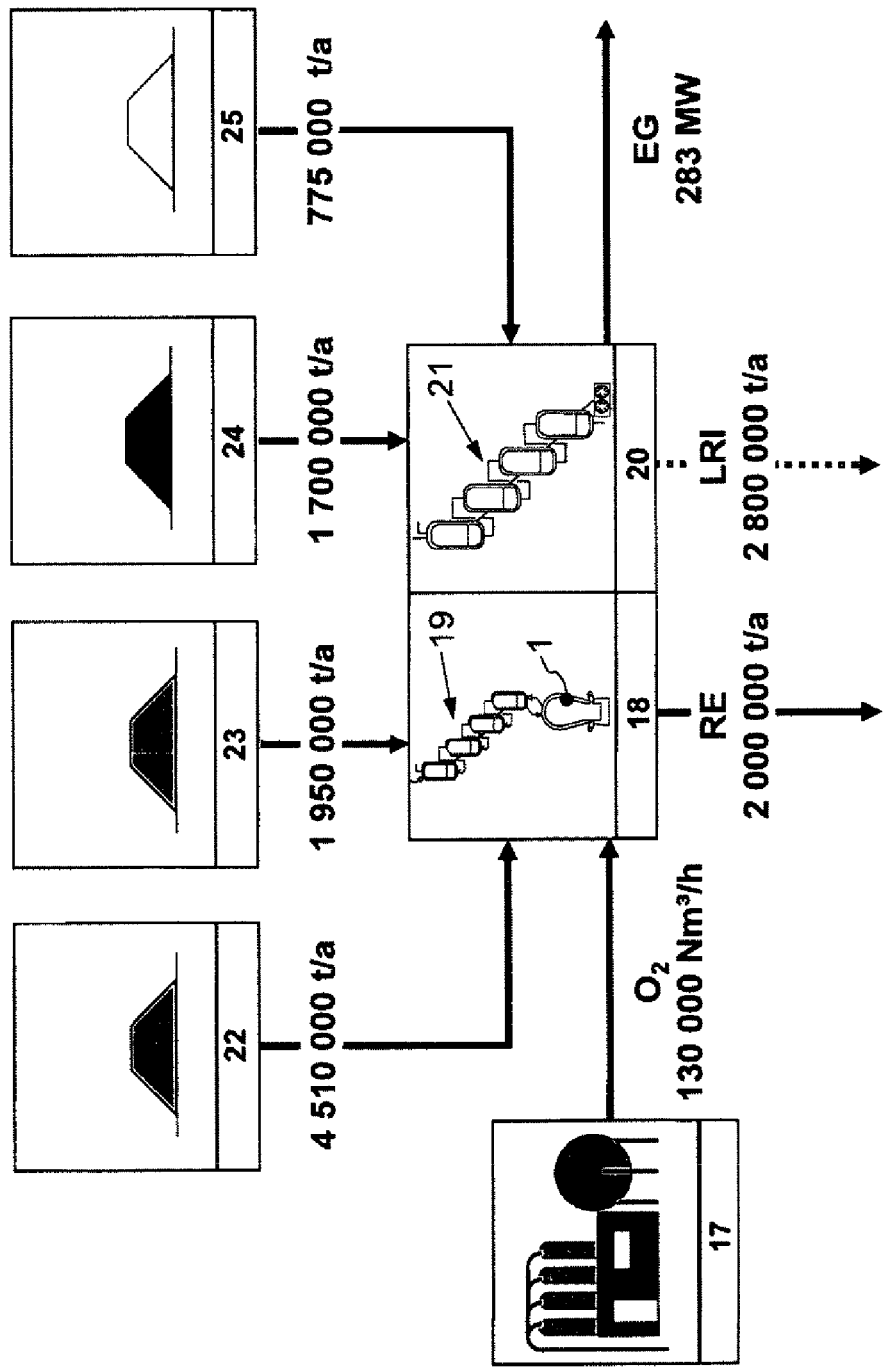

FIG. 1 shows the process diagram of a fine-ore direct reducing/smelting process FIG. 2 shows a process diagram of a fine-ore direct reducing process according to the invention FIG. 3 shows a process example on the basis of an installation according to the invention with a pressure changing process for $CO_2$ separation in combination with a blast furnace FIG. 4 shows a process example on the basis of an installation according to the invention with a vacuum pressure changing process for $CO_2$ separation in combination with a blast furnace

DESRCRIPTION OF A PREFERRED EMBODIMENT

FIG. 1 shows a process diagram and the installation for a direct reducing/smelting process for fine ores. In a smelting unit, such as for example a fusion gasifier 1, an at least partially reduced fine ore is melted down while carbon carriers, such as for example coal, are added, thereby forming reducing gas which is introduced into the row of reduction units R1 to R4 connected in series. The reducing gas thereby flows in countercurrent in relation to the fine ores to be reduced, and possibly additions, which are mixed and dried before being fed into the reduction unit R4. The at least partially reduced fine ore is made into lump form in a hot compacting unit 12 and introduced into the charging container 21, mostly while still hot, and smelted in the smelting unit 1 into pig iron RE. The charging container may also be configured as a reduction shaft. Further details of the treatment of the reducing gas are explained in more detail on the basis of FIG. 2.

FIG. 2 shows a process diagram and an installation for the direct reducing/smelting process for fine ores according to the invention. The installation has two rows of reduction units R1 to R4, In each row, the reduction units are connected in series. The two rows are arranged and connected in parallel to one another, so that, by analogy with the diagram that is shown in FIG. 1, the reducing gas is conducted in the reduction units in countercurrent in relation to the charge materials that are at least partially reduced by the reducing gas. Both rows are supplied with reducing gas from the smelting unit 1 by way of reducing gas lines.

The process according to the invention can also be operated, however, with an installation according to FIG. 1, wherein the reduction is only operated in one row of reduction units connected in series.

The reducing gas is generated by adding carbon carriers, such as lump coal K or fine coal FK or coal dusts KS into the smelting unit 1. Fine coal or coal dusts are in this case injected into the smelting unit. The pig iron RE is drawn off from the smelting unit 1 together with slag.

After cleaning the reducing gas in a dry separating device, such as for example a cyclone 2, the reducing gas is fed to the reduction units. Solids separated in the separating device 2 are returned into the smelting unit 1.

After cleaning in the separating device 2, excess reducing gas is fed to a scrubber 3 and cleaned further. The scrubber may be configured for example as an annular gap scrubber, it being possible for the flow through the scrubber to be regulated by setting the annular gap, so that the pressure in the smelting unit 1 can be regulated by way of the scrubber 3.

The scrubbed reducing gas can then be mixed with top gas, which is drawn off from the reduction unit R4, and fed as recycled gas to a $CO_2$ separating device 5 by means of a compressor 4. Separated gas fractions that predominately comprise $CO_2$ are discharged as tail gas by way of the tail gas line 6, the tail gas line 6 opening into the export gas line 7, so that excess top gas can be discharged together with tail gas as export gas EG. The recycled gas cleaned of $CO_2$ is conducted as product gas by way of the product gas line 8 either into the separating device 2 or directly into the reduction units R1.

The top gas may be cooled by means of a heat exchanger 9, 9a, the heat extracted thereby being fed to a heat exchanger 10 and used for heating the product gas. Furthermore, after cooling in the heat exchanger, the top gas may be cleaned in scrubbers 16, 16a.

The reducing gas, and possibly also product gas, are fed to the reduction units R1. These gases flow through the reduction units in countercurrent in relation to the charge materials E, and possibly the additions Z. The reduction unit R4 is operated as a preheating unit for preheating the charge materials and the additions. The charge materials and the additions are first mixed and dried in an oxide dryer 11 and fed by way of suitable devices to the reduction units R4.

The at least partially reduced charge materials, and possibly the additions, are discharged from the reduction units R1 of the two rows and fed to two devices for hot compacting 12 and 13, so as to produce a product in lump form, such as for example briquettes.

This product may be fed to a device for quenching 14, such as for example a quenching basin, and cooled, so that oxidation processes can be avoided. The product in lump form that is produced in the reduction, comprising at least partially reduced charge materials, such as fine ores, in particular fine iron ores, and possibly additions, is referred to as Low Reduced Iron (LRI) and represents a high-quality charge material for smelting reduction processes.

The LRI can be charged in a hot state directly into a smelting reduction unit 15, this advantageously being a blast furnace. Alternatively, cold LRI or mixtures of hot and cold LRI may also be charged into the smelting reduction unit. The at least partially reduced charge materials, and possibly the additions, may be introduced into the smelting reduction unit as briquettes or in some other lump form as Fe carriers in place of sinter, so as to dispense with the need for at least some of the sinter. This makes it possible for large amounts of sinter and/or pellets and/or lump ore to be saved in the sintering process at the sintering installation. The saving of sinter is particularly advantageous, since the exhaust gases occurring during sintering, and the coke required therefor, can be distinctly reduced. Furthermore, the amount of coke required in the blast furnace can also be reduced, since the LRI introduced in place of the sinter lowers the specific energy consumption. At the same time, the reduced specific coke consumption allows the specific output of the blast furnace to be increased. A possible process route is presented below by way of example on the basis of an actual example according to FIG. 3.

The installation comprises a row 19 of reduction units connected in series, which are in connection with a smelting unit, in the actual case with a fusion gasifier 1.

This plant is known as a FINEX® installation 18. In addition, the fusion gasifier 1 is in connection with a further row 21 of reduction units connected in series. The at least partially reduced charge materials and additions produced in this row are referred to as Low Reduced Iron (LRI). This plant 20 is correspondingly referred to as the LRI installation. The LRI installation is similarly operated with reducing gas from the fusion gasifier 1, so that the two rows of reduction units are operated substantially parallel to one another. The LRI usually has a degree of reduction of 60 to 70%.

Concentrates of ores 22, in particular iron ores, come into consideration as charge materials, producing an ore concentrate on the basis of naturally occurring ores with enrichment of the iron oxides. Apart from the concentrates, sintered ores 23 are used. These are ores which are usually added to a sintering installation and have small grain sizes, that is to say are to be classified as fine ores.

Furthermore, coal 24 and additions 25 are used, the coal being charged into the fusion gasifier to generate the reducing gas and to smelt the pig iron.

On the basis of annually
  4 million tonnes of concentrate
  1.7 million tonnes of sintered ore
  1.7 million tonnes of coal
  0.7 million tonnes of additions
  130 000 $Nm^3$/hour of oxygen from the oxygen installation 17,
it is possible to produce per year approximately
  2 million tonnes of pig iron and
  2.2 million tonnes of LRI;
the 2.2 million tonnes of LRI can be fed to a smelting reduction unit, such as for example a blast furnace, as a substitute for sinter. In addition, an export gas EG with an energy content of approximately 364 MW is produced and can be passed on for external use, for example in a power generating plant. On the basis of the LRI and sinter, coke and additions, approximately 4 million tonnes of pig iron can consequently be produced in a blast furnace.

Use of the LRI in the blast furnace makes it possible to substitute up to 60% of sinter with LRI, it being possible for this to be increased further by adaptations to the operating mode of the blast furnace. As a consequence, the sintering installation can be made to smaller dimensions or sintering exhaust gases and coke required for the sintering can be reduced.

A further advantage is that the amount of coke required in the blast furnace can be correspondingly reduced; using LRI for 40 to 50% of the iron fraction of all the Fe carriers, approximately 150-200 kg of coke per tonne of pig iron can be saved. Operating the FINEX® installation with the LRI installation and a blast furnace, approximately 25-40% of the total amount of pig iron is produced by means of the smelting unit of the FINEX® installation and approximately 60-75% is produced by means of the blast furnace. Apart from the reduced consumption of coke and carbon carriers overall, less export gas occurs in the case of the process according to the invention, so that an altogether more efficient process with lower environmental impact can be ensured. Consequently, considerable cost advantages per tonne of pig iron produced can be achieved. The amounts specified are influenced by the type of $CO_2$ separating device that is used.

In FIG. 4, the effect of a modified $CO_2$ separating device is represented. A vacuum pressure changing process is used in place of a pressure changing process for the separation of $CO_2$ from the recycled gas, so that the amount of LRI that can be produced by the installation can be increased considerably. With adaptation of the amounts of concentrate, sintered ore and additions, the amount of LRI is thereby successfully increased from approximately 2.2 million tonnes to 2.8 million tonnes, while allowing the amount of export gas to be reduced. The necessary amount of carbon carriers remains unchanged. The calorific value of the export gas EG is reduced when the vacuum pressure changing process is used.

The process thereby uses a still more effective separation of $CO_2$, which is achieved by lowering the minimum pressure to virtually the level of a vacuum.

The invention claimed is:

1. A process for producing pig iron or liquid primary steel products in a melter gasifier and a smelting reduction unit, comprising:
   at least partially reducing iron-ore-containing charge materials in at least one reduction unit by means of a reducing gas,
   melting a first fraction of the at least partially reduced charge materials in the melter gasifier and also supplying carbon carriers, and oxygen-containing gas to the melter gasifier for simultaneous formation of the reducing gas,
   feeding the reducing gas to the at least one reduction unit and, after the reducing gas has passed through the reduction unit, drawing off the reducing gas which has passed through the reduction unit, as top gas or as export gas, and
   feeding a second fraction of the at least partially reduced charge materials, Fe carriers other than the second fraction of the at least partially reduced charge materials, and carbon containing reducing materials to the smelting reduction unit for reducing the second fraction of the at least partially reduced charge materials and smelting it, wherein the amount of the second fraction of the at least partially reduced charge materials is 10-60%, with reference to an iron fraction of all Fe carriers that are charged into the smelting reduction unit.

2. The process as claimed in claim 1, wherein the amount of the second fraction of the at least partially reduced charge materials is established in accordance with at least one of: a selected amount of top gas, the amount of export gas, and the quality of the export gas.

3. The process as claimed in claim 1, wherein an amount of the second fraction of the at least partially reduced charge materials (LRI) is up to 1.2 times an amount of pig iron obtained in the melter gasifier.

4. The process as claimed in claim 1, wherein a degree of reduction in at least one of: (1) the second fraction of the at least partially reduced charge materials and (2) the charge materials used in the melter gasifier is set to 40-95%.

5. The process as claimed in claim 1, wherein the at least partial reduction of the iron-ore-containing charge materials is performed in a row of 2 to 6 reduction units connected in series, the reducing gas being conducted in countercurrent in relation to the iron-ore-containing charge materials to be reduced.

6. The process as claimed in claim 1, wherein the reduction of the iron-ore-containing charge materials is performed in at least two mutually parallel rows of the reduction units, the reduction units in each row of the at least two mutually parallel rows being connected in series.

7. The process as claimed in claim 1, further comprising passing along the at least partially reduced charge material from the at least one reduction unit and then compacting it.

8. The process as claimed in claim 1, further comprising charging the second fraction of the at least partially reduced charge materials into the smelting reduction unit in place of sinter.

9. The process as claimed in claim 1, further comprising introducing the at least partially reduced charge materials into at least one of: (1) the melter gasifier and (2) the smelting reduction unit in a hot state.

10. The process as claimed in claim 1, further comprising hot compacting the at least partially reduced charge materials then cooling the at least partially reduced charge material to avoid oxidation processes.

11. The process as claimed in claim 1, wherein the reduction of the charge materials is performed in a fluidized bed in the at least one reduction unit.

12. The process as claimed in claim 1, wherein the reduction of the charge materials takes place in a reducing shaft furnace, a rotary tubular furnace or a rotary hearth furnace, and wherein the charge materials are in the form of at least one of: (1) pellets, (2) lump ore, and (3) sinter.

13. The process as claimed in claim 1, wherein the reduction of the charge materials takes place on levels lying one above the other in a multi-level reduction furnace, and the charge materials undergo restricted guidance by means of a clearer.

14. The process as claimed in claim 1, further comprising dedusting the reducing gas drawn off from the melter gasifier, in a dedusting device, and feeding the dedusted reducing gas to the at least one reduction unit.

15. The process as claimed in claim 1, further comprising partially combusting the reducing gas in the at least one reduction unit while supplying oxygen to set a temperature of the reduction unit.

16. The process as claimed in claim 1, further comprising mixing the charge materials with additives, selected from the group consisting of limestone, burnt lime, hydrated lime, dolomite, burnt or hydrated dolomite and quartz, and drying the mixture before charging it into the at least one reduction unit, wherein the charge materials and the additives have approximately the same grain size.

17. A process for producing pig iron or liquid primary steel products in a melter gasifier and a smelting reduction unit, comprising:
   at least partially reducing iron-ore-containing charge materials in at least one reduction unit by means of a reducing gas,
   melting a first fraction of the at least partially reduced charge materials in the melter gasifier and also supplying carbon carriers, and oxygen-containing gas to the melter gasifier for simultaneous formation of the reducing gas,
   feeding the reducing gas to the at least one reduction unit and, after the reducing gas has passed through the reduction unit, drawing off the reducing gas which has passed through the reduction unit, as top gas or as export gas,
   feeding a second fraction of the at least partially reduced charge materials and Fe carriers other than the second fraction of the at least partially reduced charge materials to the smelting reduction unit for reducing and smelting, wherein the amount of the second fraction of the at least partially reduced charge materials is 10-60%, with reference to an iron fraction of all Fe carriers that are charged into the smelting reduction unit, dedusting the reducing gas drawn off from the melter gasifier, in a dedusting device, and feeding the dedusted reducing gas to the at least one reduction unit, and dedusting and scrubbing excess reducing gas and compressing the reducing gas as recycled gas, feeding the recycled gas to a $CO_2$ separation unit and separating at least some $CO_2$ from the recycled gas, and subsequently passing the recycled gas as a product gas into the dedusting device or directly into the reduction unit.

18. The process as claimed in claim 17, further comprising setting the pressure in the melter gasifier by a setting means of a scrubber for scrubbing the excess reducing gas.

19. The process as claimed in claim 17, further comprising heating the product gas before it is returned into the dedusting device or directly into the at least one reduction unit.

20. The process as claimed in claim 17, further comprising cooling and scrubbing the top gas before mixing the top gas with the excess, dedusted reducing gas, removing heat from the top gas and using the removed heat for heating the product gas before it is returned into the dedusting device or into the at least one reduction unit.

21. The process as claimed in one of claims 17, wherein the separated $CO_2$ is discharged together with top gas as export gas.

22. The process as claimed in claim 17, further comprising setting the amount of recycled gas and the amount of carbon carriers in the melter gasifier in accordance with the amount of the at least partially reduced charge materials.

\* \* \* \* \*

UNITED STATES PATENT AND TRADEMARK OFFICE
CERTIFICATE OF CORRECTION

PATENT NO. : 8,632,622 B2  
APPLICATION NO. : 12/996415  
DATED : January 21, 2014  
INVENTOR(S) : Boehm et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 287 days.

Signed and Sealed this

Twenty-second Day of September, 2015

Michelle K. Lee
*Director of the United States Patent and Trademark Office*